United States Patent Office.

CHARLES P. WILLIAMS, OF PHILADELPHIA, PENNSYLVANIA.

ART OF EXTRACTING GOLD BY MEANS OF ALKALINE SULPHIDES.

SPECIFICATION forming part of Letters Patent No. 292,605, dated January 29, 1884.

Application filed March 17, 1883. (No specimens.)

*To all whom it may concern:*

Be it known that I, CHARLES P. WILLIAMS, of the city and county of Philadelphia, State of Pennsylvania, have invented an improvement in the art of extracting gold by means of alkaline sulphides from native and artificial gold-bearing sulphurets and native minerals or artificial products containing gold, of which the following is a specification.

My invention relates to the extraction of gold from native sulphurets—such as pyrites, copper pyrites, blende, and galena—whether alone or in association with each other, and from artificial sulphides produced in various metallurgical operations, and commonly known as "mattes," or from other native gold-bearing minerals or artificial gold-bearing products, by converting the gold contained in them into sulphide of gold, simultaneously with the production of a large excess of the sulphides of the alkaline or alkaline-earthy metals, and without the fusion of the material under treatment, and subsequently leaching the mass, and precipitating the gold from its solution in the alkaline or alkaline-earthy sulphide, either in the form of sulphide of gold or as metallic gold. I have discovered that when gold-bearing materials are calcined with alkaline or alkaline-earthy sulphides the whole of the contained gold is converted into sulphide of gold in a condition to be dissolved out by treating the mass with water.

To carry my invention into effect, I crush and pulverize the ore or gold-bearing material to a fineness sufficient to pass a sieve of not less than forty holes to the linear inch. The powder thus obtained is intimately mixed with about ten per cent. of its weight of alkaline sulphate—such as the sulphates of potassium and sodium—or sulphate of the alkaline-earthy metals—such as the sulphates of barium, strontium, calcium, and magnesium; but preferably I use sulphate of soda in the form known as "salt-cake," on account both of its cheapness and its chemical effectiveness. I have found the proportions given above to be effective in experiments tried by me; but they will of course vary with different ores treated. The sulphate should be ground to the same degree of fineness as the ore or matte which is being treated. To this mixture ten per cent. or more, by weight, of ground charcoal, coal-dust, or other carbonaceous matter is added, and the whole mass thoroughly and intimately mixed, and then charged into a furnace, muffle, or retort so arranged that the charge, while being treated, shall be exposed to an atmosphere which is not sensibly oxidizing. The heating of the mixture reduces the alkaline sulphate to alkaline sulphide, while at the same time sulphide of gold is formed. The temperature to which the mass in treatment is to be subjected depends on the composition of the ore and the nature of its associated gangues or vein-stones, and must not be so great that the mass will fuse, while the minimum temperature at which the treatment will be possible will be that at which the alkaline sulphate is decomposed by the carbonaceous material employed into the alkaline sulphide. I have found in the case of a gold-bearing sulphide ore with which I have experimented, using sulphate of soda and charcoal, that satisfactory results were obtained at a temperature of dull-redness, or about 1200° Fahrenheit. It is essential that the fusion of the mass should be avoided, because under such conditions the alkaline sulphide which has been produced during the treatment would be in whole or in part decomposed by the union of the silicious constituents of the ores with the alkaline base, and the mass on leaching would proportionately neither yield the solvent for the sulphide of gold nor have the gold in condition for recovery by solution. In the case of artificial sulphides or mattes, in the production of which the greater part of the silicious matters of the original ore have been scorified or slagged off, the danger from the fusion of the mass is greatly lessened; but even with these it should be avoided, on account of the difficulty of penetrating the fused mass thoroughly with the water, which will result in not extracting all the sulphide or gold, or in producing a very dilute solution, which will be inconvenient in the further treatment.

It is important that the atmosphere of the furnace-chamber in which the reduction is taking place should not be oxidizing, as such conditions will result in a conversion of the alkaline sulphide to alkaline sulphate, and the treatment will be proportionally ineffective and void.

It is obvious that other materials than the sulphates and carbon can be used as a source of the alkaline sulphide—as, for example, a mixture of alkaline carbonate or caustic alkali with sulphur or with bisulphide of iron—so that the admixture of the reducing carbonaceous matter will not be necessary.

After thorough calcination and the formation of the sulphide, either by the reduction of the sulphate to sulphide or by the other methods mentioned, the mass is allowed to cool out of contact with the air to a temperature below that at which the contained sulphides would be decomposed, and then discharged into proper leaching or lixiviating tubs, where it is treated with sufficient water to dissolve the alkaline sulphide, and through this solution the sulphide of gold, which is either mechanically dissolved or combined with the alkaline sulphide as an auro-sulphide of the alkaline metal. From the filtered solution the gold is precipitated in the form of sulphide of gold by the addition of an excess of sulphuric or muriatic acid, or in the form of metallic gold by the use of zinc plates, either alone or aided by the battery.

I do not claim to be the inventor of these modes of recovering the gold from its solution in the alkaline sulphide, as they are well known in the arts.

I am aware that alkaline sulphide of gold has been formed by fusing an alkaline sulphide with a matte containing gold, and afterward, by adding water, dissolving out from the solidified mass, through the agency of the alkaline sulphide, the sulphide of gold thus formed; but I believe that I am the first to discover that alkaline sulphide of gold can be formed in the presence of certain other sulphides by calcination and without fusion of the compound thus produced.

Having fully described my invention, what I desire to claim and secure by Letters Patent is—

1. In the art of extracting gold from ores and artificial gold-bearing products by means of alkaline sulphides, the herein-described process, which consists in mixing the gold-bearing material with carbon and an alkaline sulphate (or the equivalents of such carbon and alkaline sulphate) in proportions substantially as described, calcining said mixture in a non-oxidizing atmosphere at a temperature, substantially as described, below the point of fusion of the charge, cooling the mass out of contact with the air, and leaching the cooled mass with water to dissolve out the soluble sulphides, and recovering the gold therefrom by precipitation, as described.

2. In the art of extracting gold from ores and artificial gold-bearing products by means of alkaline sulphides, the herein-described process, which consists in mixing the gold-bearing material with carbon and an alkaline sulphate (or the equivalent of such carbon and alkaline sulphate) in proportions substantially as described, in a non-oxidizing atmosphere at a temperature, substantially as described, below the point of fusion of the charge, leaching the mass with water to dissolve out the soluble sulphides, and recovering the gold therefrom by precipitation, substantially as described.

In testimony of which invention I hereunto set my hand.

CHARLES P. WILLIAMS.

Witnesses:
    R. S. CHILD, Jr.,
    JAMES F. DONAHUE.